United States Patent [19]

Dijkshoorn et al.

[11] Patent Number: 5,145,699
[45] Date of Patent: Sep. 8, 1992

[54] FOOD PRODUCT

[75] Inventors: Jacobus Dijkshoorn, Vlaardingen; Ebo J. Holscher, Fijnaart, both of Netherlands

[73] Assignee: Van den Bergh Foods Co., Division of Conopco Inc., New York, N.Y.

[21] Appl. No.: 585,859

[22] Filed: Sep. 19, 1990

[30] Foreign Application Priority Data

Oct. 2, 1989 [EP] European Pat. Off. ........ 89202461.3

[51] Int. Cl.$^5$ .............................................. A23D 1/08
[52] U.S. Cl. ...................................... 426/94; 426/274; 426/283; 426/284; 426/653
[58] Field of Search ................. 426/94, 283, 284, 274, 426/653

[56] References Cited

U.S. PATENT DOCUMENTS

| | | | |
|---|---|---|---|
| 3,228,775 | 1/1966 | Johnson | 426/283 |
| 3,919,434 | 11/1975 | Tsen et al. | 426/553 |
| 4,020,188 | 4/1977 | Forkner | 426/95 |
| 4,171,380 | 10/1979 | Forkner | 426/95 |
| 4,275,647 | 6/1981 | Chambers et al. | 426/283 |
| 4,569,848 | 2/1986 | Giorgetti et al. | 426/283 |
| 4,574,690 | 3/1986 | Chiao et al. | 426/283 |
| 4,587,128 | 5/1986 | Cummings | 426/94 |
| 4,618,499 | 10/1986 | Wainwright | 426/283 |
| 4,711,788 | 12/1987 | Porcello et al. | 426/94 |
| 4,721,622 | 1/1988 | Kingham et al. | 426/283 |
| 4,748,031 | 5/1988 | Koppa | 426/94 |
| 4,888,192 | 12/1989 | Ramnarine | 426/283 |

FOREIGN PATENT DOCUMENTS

| | | | |
|---|---|---|---|
| 1-265851 | 10/1989 | Japan | 426/94 |
| 386988 | 1/1933 | United Kingdom . | |
| 1510996 | 5/1978 | United Kingdom . | |

OTHER PUBLICATIONS

European Search Report and Annex.
Abstract of DE 2,414,177.
Abstract of DE 2,556,254.

*Primary Examiner*—Jeanette Hunter
*Assistant Examiner*—Mary S. Mims
*Attorney, Agent, or Firm*—Rimma Mitelman

[57] ABSTRACT

Food products comprise a filling, enclosed in a bread-like casing have an intermediate cake layer (with a fully developed cellular crumb structure) having a specific volume of 1.5 to 4.0 m$^3$/kg and a fat content of at most 20 wt % based on the total recipe of the cake batter. The cake is preferably formed from a batter having its oil or fat phase in form of an O/W-emulsion, comprising water-soluble proteins and a specific combination of emulsifiers, comprising a $C_{12}$–$C_{24}$ fatty acid acyl lactylate. Also a process of making the said food products and the use of the cake material as a moisture migration controlling agent and as a softness imparting agent therein has been disclosed.

26 Claims, No Drawings

FOOD PRODUCT

The present invention relates to food products comprising a moisture containing filling enclosed in a bread-like casing and an intermediate layer separating the filling from the bread-like casing. The invention also relates to a process of preparing such food products, and to the use of specific intermediate layers as moisture migration controlling agent and softness imparting agents in such food products.

Snack food products of the type of the products according to the present invention have been disclosed in British Patent Specification GB-A-1,510,996 (C.H. Boehringer Sohn). They comprise a ready-to-eat product in elongate form, having a casing of bread bonded to a core, i.e. the bond is sufficiently strong to prevent separation of the bread casing from the filling core during handling at ambient temperature. The bread casing can have its ends open or closed and in order to give the product a good storage life, the bread casing has a water content of at most 15% by weight. The filling has a good storage life, defined as a period of at least 6 months in hermetically sealed packs at not more than 25° C. The bread casing preferably has a moisture content of at most 10% and most preferably at most 5% by weight and the product can undergo a second baking step, i.e. in addition to that used in making the bread casing, in order to achieve such moisture contents. Generally, however, products prepared in this way are experienced to be too dry and crumbly, and therefore unappetizing due to the low moisture content of the bread casing. Another problem may be caused by the diffusion or migration of moisture from the filling to the bread casing or vice versa during storage. This makes the bread casing soggy, or dry and unappetizing and the bread casing also loses its strength.

In order to solve the problem of moisture migration it has been proposed in German Patent Specification DE-A-2,556,254 (CH Boehringer Sohn) to provide between the rather moist filling and the bread casing of such a product, a water-impermeable and water-insoluble edible intermediate layer, made from film-forming substances used in the food and pharmaceutical industries, like maize protein (zein), or sodium alginate. Also oil-based materials have been proposed for this purpose, like in U.S. Pat. No. US-A-4,748,031 (Nabisco Brands Inc.). The disadvantage of all these types of intermediate layers is that they on the one hand do not constitute a homogeneous film, so that no sufficient barrier properties are achieved, and on the other hand constitute a layer which organoleptically is perceived as unattractive and in case alginate material is used, still moisture migration takes place at longer storage periods.

It is the purpose of the present invention to avoid these disadvantages of the prior art products and to provide products of this type which remain microbiologically stable for 9 months at a storage temperature of 18° C., but which at the same time also remain organoleptically completely satisfactory (e.g. retain their succulence) under these storage conditions. Moreover, during its manufacture and the constituents should have such properties that upon baking, the organoleptic properties should in no way be impaired.

To this purpose an intermediate layer is provided between the moisture containing filling and the bread-like casing which materially retards the negative influence (e.g. sogging by moisture migration) of the moisture of the filling on the organoleptic properties of the bread-like casing upon storage. This intermediate layer has such a structure and such a water activity that, on the one hand, migration of moisture (but also of e.g. colours (bleeding), salt and other ingredients) during storage is controlled as much as possible, and that, on the other hand, its organoleptic properties (e.g. eating sensation and softness) are as close to those of the bread-like casing as possible, and thus it contributes positively to the organoleptic properties of the final product.

It has been found that the often conflicting requirements for the intermediate layer are yet fulfilled by forming the intermediate layer from a cake material. Since in the preparation of the food products comprising a filling in a bread-like casing also a proofing step is applied for the proper formation of the bread-like casing, it is surprising that the intermediate cake batter layer survives this treatment, since normally cake batters do not stand such a proofing step.

The cake batter used for the preparation of the intermediate layer of cake material preferably is extrudable (and hence should have a good consistency which can be determined by means of a penetrometer value), and in the batter the stability of the air bubbles should be as high as possible, since it has been found essential that a fully developed, tender cellular crumb structure is obtained, which at the same time is sufficiently moist and chewy.

It has been found in extensive experiments that the required fully developed cellular crumb structure and the required level of aeration, leading to a specific volume of the baked cake of from 1.5 to 4.0 $m^3/kg$, preferably from 2.0 to 3.0 $m^3/kg$, are particularly obtained, if the cake batter used for the formation of the intermediate layer of cake material has a fat content of at most 20% by weight (based on the total batter recipe).

It has also been found that an optimal consistency of the cake batter and an optimal air bubble distribution in the cake batter is obtained if the oil or fat phase of the batter is in the form of an oil-in-water type emulsion, containing water-soluble proteins, and a $C_{12}$–$C_{24}$ fatty acid acyl lactylate (either as free acid, as alkali metal salt, or as alkaline earth metal salt) together with very specific emulsifiers. During the experiments it was found, that this specific combination of conditions enables the use of liquid oils in the preparation of the cake batter for the intermediate cake material layer, thus appreciably widening the range of possible recipes.

Therefore the present invention relates to a food product comprising a moisture containing filling, enclosed in a bread-like casing and an intermediate layer separating the filling from the bread-like casing, which is characterized in that the intermediate layer is of a cake material having a specific volume of from 1.5 to 4.0 $m^3/kg$. Preferably the specific volume is from 2.0 to 3.0 $m^3/kg$. The cake material has a fully developed cellular crumb structure.

Preferably the cake is formed from a batter having a fat content of at most 20% by weight (based on the total cake batter) of which the oil or fat phase is in the form of an oil-in-water emulsion, comprising water-soluble proteins and a combination of emulsifiers comprising a $C_{12}$–$C_{24}$ fatty acid acyl lactylate together with (a) a polyglycerol ester of an unsaturated $C_{12}$–$C_{24}$ fatty acid, or (b) a monoglyceride of a $C_{12}$–$C_{24}$ unsaturated fatty acid, or (c) a mixture of a monoglyceride of a $C_{12}$–$C_{24}$ saturated fatty acid and a monoglyceride of a $C_{12}$–$C_{24}$ unsaturated fatty acid.

In the products according to the present invention the bread-like casing is made from a yeast-raised or other bread dough. It forms a complete enclosure for the filling. The moisture content and the composition of the dough from which the bread-like casing is made and the resultant humidity of the casing in baked form are such that in the final products the water activity of the bread-like casing immediately after baking is from 0.90 to 0.97, preferably from 0.95 to 0.97. The bread-like casing preferably is based on whole meal flour, like whole wheat or rye flour. It can also contain preservatives like sorbate and calcium propionate, flavour precursors which upon baking give rise to flavour formation, flavouring agents, herbs, spices, stabilizers, pH regulators, vitamins, emulsifiers (like fatty acid monoglycerides), minerals, vegetables, fruits and extra fibres. During the dough manufacture of the bread-like casing also processing aids may be added, and after the preparation of the yeast-raised dough it is subjected to a proofing step.

In baked condition the outer surface can be imparted a gloss by means of a glazing agent, e.g. such as described in European Patent Specification EP-A-0,205,195 (Unilever), or it can be provided with surface decoration. Preferably the bread dough has such a composition and consistency that it can be rolled or pumped and extruded.

The filling in the products according to the present invention may be of the sweet or the savoury type and can be made from a wide variety of components, but it should preferably be heat-pasteurizable or heat-sterilizable. The water activity range of the filling may vary widely, but preferably it is at least 0.70. The filling preferably is a meat-based filling, which may also be a sausage, such as a fermented sausage, like salami, or a bratwurst-type of sausage, both provided with or without edible casing. The meat-based fillings may comprise the meat of mammals, fish and poultry and mixtures of different types of meat may be used. The meat may have been subjected to marinading, smoking, cooking or grilling treatments. In addition, the meat-based or the savoury filling may comprise: dairy products, such as cheese; flavour precursors which upon heating give rise to flavour formation; flavouring agents, like e.g. liquid smoke, vegetables, like peppers or onion shreds; herbs; spices, stabilizers; antioxidants, like rosemary extract; vitamins; emulsifiers, like fatty acid monoglycerides or lecithin; protein from animal, vegetable or mycotic origin; egg material; dried or fresh fruit; extra fibres, or mixtures of these additives.

The fillings of the sweet type comprise fillings, nut-based fillings, confectionary products based on chocolate, nougat, marzipan and the like products and mixtures of these fillings with dairy products, like yoghurt and soft or hard cheese, vegetables, herbs and spices and those additional materials as have been mentioned above in connection with the savoury type of fillings. The use of fruit-based fillings is preferred. Preferably the filling should be pumpable and extrudable.

The food product according to the present invention preferably has an elongate shape (bar shape or sausage shape), but other forms and shapes, like cubes, balls and egg-shapes are possible as well. The cross-sectional shape preferably is circular, but it may also be elliptical, square, triangular, rectangular or other cross-sectional shape.

Generally, the ratio of the cross-sectional area of the filling to the cross-sectional area of the bread-like casing is about 1:3 if a circular cross-sectional area is used for the food product according to the present invention, but this ratio may be variable, dependent on the type of cross-sectional area. The bread-like casing should not be so thin, however, that the food product cannot be properly handled during its manufacture or use.

The intermediate cake layer, which is provided between the bread-like casing and the filling, after baking has a fully developed, tender, regular cellular crumb structure, a specific volume of from 1.5 to 4.0 m³/kg, preferably from 2.0 to 3.0 m³/kg, and a fat content of at most 20% by weight of the total batter recipe. The water activity of the intermediate layer immediately after baking is from 0.90 to 0.96.

The specific volume of the intermediate layer is determined by measuring the replacement of a weighed sample in a granular free-flowing medium consisting of seeds of millet or rape.

A container with a flat top, e.g. a wooden case which is about double the volume of the product to be measured is standing on a large tray or dish. While the container stands in this tray or dish, it is filled with the seed and the overflow is collected in the tray or the dish. The excess of seed on top of the filled wooden case is removed with a ruler. All the overflow of the seed is put aside and only the amount of seed in the wooden case is used for the measurements.

For a series of measurements a certain volume of seed in the wooden case is filled out of the wooden case in 100 ml measuring cylinder(s). This amount should be at least 10% to 20% below the expected volume of the product to be measured (e.g. for a loaf of bread of 3600 ml, 300 ml is measured). This is volume A and it can be put aside. The remainder of the seed in the wooden case is used further.

The wooden case is filled for about 20%. The baked product of which the volume has to be measured is placed on the seed layer and gently pressed. The rest of the seed (equal to: volume of the wooden case—volume A) is poured carefully into the wooden case until it is completely filled. The seed on top of the filled wooden case is removed with the ruler.

The volume of this removed seed is measured (volume B). The specific volume of the baked product is now calculated to be:

$$\frac{(\text{Volume } A + \text{Volume } B) \text{ in m}^3}{\text{weight of the baked product in kg}}$$

As soon as possible after the determination of the specific volume, the wooden case is emptied and the baked product taken away, so as to avoid the seeds becoming damp.

The water activity of the intermediate layer depends on the water activity of the filling and of the bread-like casing, but ranges from 0.90 to 0.96 (immediately after baking) at the values of the water activity of the filling and the casing immediately after baking, indicated hereinbefore. The water activity can be controlled by the addition of polyhydric alcohols and/or sugars, like dextrose, lactose, polydextrose. The use of lactitol is preferred.

The cake batter or dough upon baking should lead to a product having a fully developed crumb structure which is not too short or too dry. This condition is preferably met by preparing the cake batter with the indicated fat content, using as the oil or the fat phase an oil-in-water emulsion comprising water-soluble proteins and the combination of emulsifiers, indicated herebefore.

The development of the crumb structure of the intermediate cake layer is also dependent on a good enclosure of the intermediate cake layer between the filling and the outer bread layer. The filling should be well enclosed by the intermediate cake layer, taking care there are no voids or air pockets between the filling material and the cake layer. Also the bond between the intermediate cake layer and the outer bread-like casing should be homogeneous. In case a sausage is used as the filling material, it may be provided with a coating of an edible adhesive material, like for example wheat gluten.

Finally, the development of the crumb structure of the intermediate cake layer is also somewhat dependent on the baking conditions. A baking time of 10-45 minutes at 180°-230° C., the shorter time corresponding with the higher temperature, is appropriate. Examples of baking conditions are 11 minutes at 230° C., or 18 minutes at 200° C.

The fat or oil used for the manufacture of the cake material may be of vegetable or animal origin and may be synthetic fat. It may be a single fat or oil or fat fraction or a mixture of oils, fats and/or fat fractions. At least part of the fat may be replaced by a low-calorie fat replacer. Particularly suitable fat replacers are the edible polyesters of polyhydric alcohols having at least four free hydroxyl groups, such as polyglycerols, sugars or sugar alcohols, and saturated or unsaturated, straight or branched alkyl chain $C_8$–$C_{24}$ fatty acids. The polyhydric alcohol fatty acid polyesters include any such polyesters or mixtures thereof of which, on an average, at least 70% of the polyhydric alcohol hydroxyl groups have been esterified with the fatty acids. Also fatty alkyl ether derivatives of glycerol, esters of $C_8$–$C_{24}$ fatty alcohols and polycarboxylic acids, waxes and microcrystalline cellulose can be used for replacing at least part of the fat, provided that in the final cake a fully developed crumb structure is obtained.

The incorporation of liquid oil onto the cake batter may sometimes be facilitated by the use of an absorption agent in the form of expanded, at least partially gelatinized, starch, e.g. as described in European Patent Application EP-A- 0,273,751, which is marketed under the trade name Aero-Myl.

The water-soluble proteins may be vegetable, animal or fungal proteins and as such may be used egg whites, whole eggs, non fat dry milk solids, skimmed milk powder, whey protein and soy isolate. The use of egg white is preferred. I general from 0.5% to 10% by weight, and preferably from 3% to 6% by weight of the cake batter of water-soluble protein is used.

The specific combination of emulsifiers consists of a $C_{12}$–$C_{24}$ fatty acid acyl lactylate, which may be used either as the free acid, as the alkali metal salt, or as the alkaline earth metal salt, used together with certain selected emulsifiers. Although in no way to be bound by this theory, it is assumed that the air cells (which are present in the water phase) in the oil-in-water emulsion, constituting the oil or fat phase in the cake batter, containing the fatty acid acyl lactylate and the water-soluble proteins are basically air foams stabilized by the proteins, in which the fatty acid acyl lactylate has the function to eliminate the destructive effect of liquid or solid fat on the aeration properties.

The fatty acid lactylate encompass a wide range of lactylates, including those having a substantial range of lactyl groups and various fatty acids taken for the acyl group. The number of lactyl groups usually varies from 1 to 11, but lactylates having more than 5 lactyl groups are usually not found in most commercial products. Lactylates having on an average from 1 to 3 lactyl groups are generally used. With respect to the fatty acids, usually stearic and palmitic acids are present in the commercial products, but various acids (like also iso-stearic acid) and acid mixtures may be used for the acyl groups. Suitable products which may be used in the present invention are for example Admul CSL 2008, Admul SSL 2004, or Admul SSL 2012 (ex Quest International, Zwijndrecht, The Netherlands). The use of the sodium salt of the $C_{12}$–$C_{24}$ fatty acid acyl-2-lactylate is preferred.

The $C_{12}$–$C_{24}$ fatty acid acyl lactylate is used conjointly with:

(a) a polyglycerol ester of a $C_{12}$–$C_{24}$ unsaturated fatty acid, or (b) a monoglyceride of a $C_{12}$–$C_{24}$ unsaturated fatty acid, or (c) a mixture of a monoglyceride of a $C_{12}$–$C_{24}$ saturated fatty acid and a monoglyceride of a $C_{12}$–$C_{24}$ unsaturated fatty acid.

The polyglycerol esters are $C_{12}$–$C_{24}$ unsaturated fatty acid esters of polyglycerols having several glycerol radicals and can be prepared by polymerizing glycerol in the presence of alkali to form a mixture of glycerol, diglycerol, etc. up to and including decaglycerol. The polyglycerol mixture is then reacted with the unsaturated $C_{12}$–$C_{24}$ fatty acids in an esterification process or is catalytically interesterified with triglyceride such as the naturally occurring oils to produce mixtures of polyglycerols with the unsaturated fatty acyl groups being randomly distributed on individual glycerol radicals. The polyglycerol esters of $C_{12}$–$C_{24}$ unsaturated fatty acids useful in the present invention are those having 2 to 10, and preferably 2 to 8 glycerol units and have an iodine value of from about 40 to about 80 or higher. Products of the Admul PGE series ex Quest International, Zwijndrecht, The Netherlands have been found to be useful.

The monoglycerides of the saturated and/or unsaturated $C_{12}$–$C_{24}$ fatty acids to be used in the present invention are the commercially available mixtures of mono- and diglycerides or the distilled monoglycerides. The iodine value of the monoglycerides of the unsaturated $C_{12}$–$C_{24}$ monoglycerides to be used in the present invention ranges from about 40 to about 100. Suitable products according to the present invention are Hymono 8803 (a saturated monoglyceride) and Hymono 7804 (an unsaturated monoglyceride), both ex Quest International, Zwijndrecht, The Netherlands. The mixtures of saturated and unsaturated monoglycerides preferably consist of equal weight proportions of the two species.

The total amount of the specific emulsifier combination to be used in the preparation of the oil or fat phase of the cake batter is from 0.2% to 5% by weight of the total batter recipe, and preferably from 0.3% to 0.6% by weight. The weight ratio between the $C_{12}$–$C_{24}$ fatty acid lactylate and the specific emulsifier of the other types, indicated herebefore is dependent on the required level of aeration, but preferably the weight ratio is about 1:1.

Although the use of a cake batter in which the oil or fat phase is in the form of an oil-in-water emulsion is preferred, also other types of batters may be used in which the oil or the fat is not in the form of an emulsion but in which batters the air cells are present in the water phase. In that case also other emulsifiers may be used, such as propylene glycol partial esters of $C_{12}$–$C_{24}$ fatty acids like propylene glycol monostearate, succinylated $C_{12}$–$C_{24}$ fatty acid monoglycerides, ethoxylated monoglycerides of $C_{12}$–$C_{24}$ fatty acids, lactic acid esters of $C_{12}$–$C_{24}$ fatty acid monoglycerides, sucrose partial esters of $C_{12}$–$C_{24}$ fatty acids like sucrose monopalmitate, and mixtures of these emulsifiers. In general in that case an amount of up to 10% by weight, based on the oil or fat of the emulsifier is used.

Almost every type of flour may be used in the preparation of the intermediate cake layer. Further the usual ingredients such as sugar or sweetening agents, baking powder, salt, colouring agents, flavouring agents or flavour precursors forming the required flavour during baking, herbs, spices, vitamins, and the like may be used. The moisture is usually supplied by water or milk, but for savoury snack type products also meat bouillon may be used.

The present invention also relates to a process of preparing the food products according to the present invention, which process comprises (a) forming a sheet of bread-like casing dough, containing yeast or other dough;

(b) depositing a strip of an intermediate layer of cake batter or dough upon said bread-like dough sheet, said strip running parallel but not extending to one pair of facing parallel sides of the sheet and extending to the other pair of facing parallel sides;

(c) depositing a filling upon said strip of intermediate layer of said cake batter or dough, such that the filling is well within the edges of said strip;

(d) closing said sheet of bread-like casing dough provided with said strip of intermediate layer of said cake batter or dough so that the filling is entirely enclosed, first by the intermediate layer of said cake batter or dough and subsequently by the bread-like casing dough; and (e) subjecting the thus formed food product to proofing and baking.

The baked composite food product can be packaged, and the packaged, baked product can be post-pasteurized.

According to the present invention a second embodiment of the process of preparing the food product according to the present invention comprises:

(a) forming a sheet of bread-like casing yeast-containing or other dough;

(b) depositing a strip of an intermediate layer of cake batter or dough upon said bread-like dough sheet, said strip running parallel but not extending to one pair of facing parallel sides of the sheet and extending to the other pair of facing parallel sides;

(c) depositing a filling upon said strip of intermediate layer of cake batter or dough, such that the filling is within the edges of said strip;

(d) covering said filling with a second strip of said intermediate layer of cake batter or dough, such that said second strip is almost equal and similar to said first strip of intermediate layer of cake batter or dough;

(e) closing said strips of intermediate layer of cake batter or dough around the filling and closing said sheet of bread-like casing around the filling encased by said intermediate of cake layer batter or dough; and (f) subjecting the thus formed food product to proofing and baking.

Also in this second embodiment the baked composite food product can be packaged, and the packaged, baked product can be post-pasteurized.

Preferably the steps of sheet forming of bread-like casing dough and the deposition of the intermediate layer of cake batter or dough and of filling are carried out by extrusion or co-extrusion. The proofing step is effected to allow the yeast to raise the dough and this is done for 5 to 30 minutes at a temperature of 25°–35° C., dependent on the types of dough.

The baking can be done by means of convection heating, infra-red heating, or combinations of these forms of heating, optionally in conjunction with microwave heating.

The present invention finally relates to the use of a cake material having a specific volume of from 1.5 to 4.0 $m^3$/kg in the form of an intermediate layer between the filling and the casing as a moisture migration controlling agent in a food product comprising a casing and a moisture containing filling contained within the casing. In said use the cake material preferably has a specific volume of from 2.0 to 3.0 $m^3$/kg. The present invention also relates to the use of a cake material having a specific volume of from 1.5 to 4.0 $m^3$/kg in the form of an intermediate layer between the filling and the casing as a softness impartig agent in a food comprising a casing and a moisture containing filling contained within the casing. In said use the cake material preferably has a specific volume of from 2.0 to 3.0 $m^3$/kg.

The invention will now be illustrated by the following examples which are not to be construed as limiting the scope of the present invention.

EXAMPLE I

A bread dough was prepared by kneading the following ingredients together;

| | |
|---|---|
| wheat flour | 1140 grams |
| water | 582 grams |
| bakery margarine | 225 grams |
| castor sugar | 48 grams |
| yeast | 33 grams |
| glucose syrup | 30 grams |
| skimmed milk powder | 24 grams |
| salt | 11.4 grams |
| egg yolk powder | 11.4 grams |

The kneading of these ingredients was carried out by slowly kneading in a Diosna-kneader (1 minute in position 1; 9 minutes in position 2). The final temperature of the dough was 23° C.

The dough was left standing for 10 minutes and subsequently rolled into a sheet with thickness 1.2 mm and cut into the required dimensions (170 mm×90 mm). Onto the rectangular pieces of bread dough obtained, the cake batter (prepared as described hereafter) was applied in an amount which was half the weight of the sheet of bread dough. In the middle of the cake batter was placed a salami-type sausage of about 15 cm length having a diameter of about 12 mm, which previously had been rolled in dry wheat gluten powder.

The dough was the folded carefully around the sausage type filling in such a way that the filling was totally enclosed by the cake batter and the cake batter was entirely enclosed by the bread dough.

The outside of the obtained product was provided with a glazing agent (whole egg) and the entire product was proofed for 20 minutes at 30° C. at a relative humidity of 80–90%. The product was subsequently baked for 11 minutes at 210° C. After cooling to room temperature the product was packaged into a laminate material comprising aluminium foil, after which the sealed pack was post-pasteurised (in pack) for 15 minutes at 115° C. and subsequently stored at 20° C. After 1 month storage under these conditions the water activity of the product was 0.85. It appeared that after 6 months storage the product properties were still excellent with regard to softness and palatability in comparison to the same products having no intermediate cake layer.

In the final product obtained, the filling material was homogeneously encased by the intermediate cake layer, which also had a good bond with the bread-like outer casing.

The cake batter used in this example was prepared as follows:

The following dry ingredients were thoroughly mixed:

| wheat flour | 400 grams |
| --- | --- |
| dextrose | 100 grams |
| lactose | 100 grams |
| baking powder | 16 grams |
| skimmed milk | 4 grams |
| egg white powder | 20 grams |
| extruded expanded starch | 20 grams |
| salt | 10 grams |

The baking powder was a mixture of sodium bicarbonate and sodium hexametaphosphate.

Subsequently the following ingredients were combined:

| sunflower oil | 168 grams |
| --- | --- |
| SSL 2004 1) | 4 grams |
| Hymono 8803 2) | 2 grams |
| Hymono 7804 3) | 2 grams |

1) Sodium stearoyl lactylate, having a lactic acid content of 31–35 wt %, an ester value of 150–190, an acid value of 60–80 and a sodium content of 3.5–5.0 wt %, ex Quest International, Zwijndrecht, The Netherlands.
2) A distilled monoglyceride, having 90 wt % of monoglyceride, prepared from soybean oil and having an iodine value of at most 3, ex Quest International, Zwijndrecht, The Netherlands
3) A distilled monoglyceride, having a monoglyceride content of 90 wt %, prepared from a vegetable oil and having an iodine value of about 80, ex Quest International, Zwijndrecht, The Netherlands.

The mixture of monoglycerides was added to 10 grams of water and heated to 70°–80° C., after which the homogeneous mixture was cooled to room temperature. The sodium stearoyl lactylate, the sunflower oil and the monoglyceride mixture were then added to the mixture of dry ingredients in a Hobart mixer (1 minute in position 2).

Of the mixture thus obtained 250 grams were mixed with 100 grams of whole egg, 25 grams of water and 10 grams of seasoning in a Hobart mixer (5 minutes in position 2) upon which the cake batter was obtained. The cake obtained from this batter had a specific volume (determined as described before) of 3.0 m$^3$/kg.

EXAMPLE II

Example I was repeated, but the cake batter was prepared as follows: The same dry ingredients as indicated in Example I were mixed together in the same way. Subsequently 2 grams of Hymono 8803, 2 grams of Hymono 7804, 1 gram of beta-carotene and 2 grams of soybean lecithin were added to 10 grams of water and heated to 70°–80° C., after which the mixture was cooled to room temperature. This mixture, together with 160 grams of Biskien (a shortening consisting of a blend of vegetable and animal fat, having a solids profile F or N-line as determined by the nuclear magnetic relaxation technique as described in Fette, Seife, Anstrichmittel 80 (5), 180–186 (1978) of N15=46, N20=35, N25=25, N30=14 and N35=4, ex Bakkerol BV, Rotterdam, The Netherlands) was added to the mixture of dry ingredients as indicated in Example I.

From the final mixture obtained 250 grams were mixed with 100 grams of whole egg and 50 grams of water in a Hobart mixer (5 minutes in position 2) upon which the cake batter was obtained. The cake obtained from this batter had a specific volume (determined as described before) of 2.8 m$^3$/kg.

The final product obtained after 1 month storage at 20° C. had a water activity of 0.86. After 6 months storage the product properties were still excellent. The bread-like casing was soft and tasty and the overall product quality was rated by experienced tasters as excellent.

EXAMPLE III

Example I was repeated, but in the preparation of the cake batter the following oil and emulsifier ingredients were used: 160 grams of sunflower oil, 2 grams of Hymono 7804, 2 grams of Hymono 8803, 1 gram of beta-carotene and 4 grams of Admul PGMS 2103 (propylene glycol monostearate, having a mono-ester content of 90 wt %, an iodine value of at most 2, and an acid value of at most 2, ex Quest International, Zwijndrecht, The Netherlands) were used. The cake obtained from this batter and a specific volume (determined as described before) of 2.2 m$^3$/kg.

The final product obtained had the same excellent properties as described in Example I.

EXAMPLE IV

A bread dough was prepared by kneading the following ingredients together in a Diosna-Kneader (10 minutes kneading at position 2; 10 minutes resting time):

| Wheat flour | 1000 grams |
| --- | --- |
| Water | 510.5 grams |
| Baker margarine | 197.4 grams |
| Castor sugar | 42.1 grams |
| Yeast | 29.0 grams |
| Inert syrup | 26.3 grams |
| skimmed milk powder | 21.0 grams |
| salt | 10 grams |
| whole egg powder | 10 grams |

After resting the dough was rolled into a sheet with thickness 1.5 mm and cut into rectangular pieces of 150 mm×70 mm. Onto the rectangular pieces of bread dough obtained (weighing about 30 grams), the cake-batter (prepared as described hereafter) was applied in an amount of 10 grams. In the middle of the cake batter was placed a cylindrical marzipan filling (diameter about 10 mm and length about 100 mm) of 35 grams. On top of this cylindrical filling was placed another 10 grams of cake batter, after which the dough was folded very carefully around the filling material in such a way that the filling was first enclosed by the cake batter and the cake batter, in turn, was enclosed by the bread dough.

The entire product was then proofed for 20 minutes at about 30° C. and a relative humidity of 80% and subsequently baked for 12 minutes at 210° C. in a Dahlen bakery oven.

After cooling to room temperature, the product was packaged in a laminate material comprising aluminium foil, after which the sealed pack was post-pasteurised (in-pack) for 15 minutes at 115° C. and subsequently stored at 20° C. After 1 month storage under these conditions the water activity of the product was 0.86. It appeared that after 6 months storage, the product properties were still excellent with regard to softness and taste in comparison to the same products having no intermediate cake layer.

The cake batter used in this example was prepared as follows:

| Wheat flour | 400 grams |
|---|---|
| Dextrose | 100 grams |
| Lactose | 100 grams |
| Baking powder | 16 grams |
| skimmed milk powder | 4 grams |
| egg white powder | 20 grams |
| expanded starch | 20 grams |
| salt | 10 grams |
| fatty phase | 278 grams | were mixed in a Hobart mixer (1 minute in position 2). Of the mixture thus obtained 250 grams were mixed (2 minutes in position 3) upon which the cake batter was obtained. The cake obtained from this batter had a specific volume (determined as described before) of 2.6 m$^3$/kg.

The fatty phase of the cake was obtained by mixing 160 grams of sunflower oil, 4 grams of SSL 2004, 1 grams of beta-carotene, 2 grams of soybean lecithin and 4 grams of Admul PGE-1411 (a polyglycerol fatty acid ester having an iodine value of about 45, a saponification value of 105-145 and an acid value of at most 6, ex Quest International, Zwijndrecht, The Netherlands).

EXAMPLE V

Example IV was repeated, but in the preparation of the cake batter 160 grams of sunflower oil, 4 grams of SSL 2004, 1 gram of beta-carotene and 4 grams of Hymono 7804 were used. The cake obtained from this batter had a specific volume (determined as described before) of 2.8 m$^3$/kg. The final product obtained had the same excellent properties as described in Example IV.

We claim:

1. A food product comprising a moisture-containing filling enclosed in a bread casing and an intermediate layer separating the filling from the bread casing, wherein the intermediate layer is of a cake batter or cake dough which upon baking of the food product results in a cake material having a specific volume of from 1.5 to 4.0 m$^3$/kg.

2. A food product according to claim 1, wherein the cake material has a specific volume of from 2.0 to 3.0 m$^3$/kg.

3. A food product according to claim 1, wherein the cake material has a fully developed cellular crumb structure.

4. A food product according to claim 1, wherein the cake material has a fat content of at most 20% by weight based on the total cake batter.

5. A food product according to claim 1, wherein the bread-like casing is based on a whole meal flour.

6. A food product according to claim 1, wherein the filling is a savoury filling.

7. A food product according to claim 1, wherein the filling is a meat-based filling.

8. A food product according to claim 1, wherein the filling is a fermented sausage.

9. A food product according to claim 1, wherein the filling is a sweet filling.

10. A food product according to claim 1, wherein the filling is a fruit-based filling.

11. A food product according to claim 1, wherein the cake material of the intermediate layer is formed from a batter of which the oil or fat phase is in the form of an oil-in-water emulsion comprising water-soluble proteins and a combination of emulsifiers, comprising a $C_{12}$–$C_{24}$ fatty acid acyl lactylate, together with:

(a) a polyglycerol ester of an unsaturated $C_{12}$–$C_{24}$ fatty acid, or (b) a monoglyceride of an unsaturated $C_{12}$–$C_{24}$ fatty acid, or (c) a mixture of a monoglyceride of a saturated $C_{12}$–$C_{24}$ fatty acid and a monoglyceride of an unsaturated $C_{12}$–$C_{24}$ fatty acid.

12. A food product according to claim 11, in which the water-soluble proteins are selected from the group consisting of: vegetable proteins, animal proteins, fungal proteins and mixtures thereof.

13. A food product according to claim 11, in which the water-soluble protein is selected from the group consisting of: whole eggs, egg white, non-fat dry milk solids, skimmed milk powder, whey protein, and mixtures thereof.

14. A food product according to claim 11, in which the amount of water-soluble protein is from 0.5% by weight to 10% by weight, based on the weight of the cake batter.

15. A food product according to claim 11, in which at least part of the fat or oil is replaced by a low-calorie fat replacer.

16. A food product according to claim 11, in which at least part of the fat or oil is replaced by an edible polyester of polyhydric alcohols having at least four free hydroxyl groups, of which on an average at least 70% is esterified with a saturated or unsaturated, straight or branched alkyl chain $C_8$–$C_{24}$ fatty acid.

17. A food product according to claim 11, in which a liquid oil is incorporated into the batter absorbed in expanded, at least partially gelatinized starch.

18. A food product according to claim 11, in which the $C_{12}$–$C_{24}$ fatty acid acyl lactylate is selected from the group consisting of: the free acid, the alkali metal salts, the alkaline earth metal salts, and mixtures thereof.

19. A food product according to claim 11, in which the weight ratio of monoglyceride of saturated $C_{12}$–$C_{24}$ fatty acid to monoglyceride of unsaturated $C_{12}$–$C_{24}$ fatty acid is 1:1.

20. A food product according to claim 11, in which the total amount of the combination of emulsifiers is from 0.2% by weight to 5% by weight, of the total recipe.

21. A food product according to claim 11, in which the weight ratio between the $C_{12}$–$C_{24}$ fatty acid acyl lactylate and the specific emulsifier (a), (b), or (c) is from 1 to 1.

22. A process of preparing a food product according to claim 1, which comprises:

(a) forming a sheet of bread-like casing yeast-containing or other dough;

(b) depositing a strip of an intermediate layer of cake batter or dough upon said bread-like dough sheet, said strip running parallel but not extending to one pair of facing parallel sides of the sheet and extending to the other pair of facing parallel sides;

(c) depositing a filling upon said strip of intermediate layer of said cake batter or dough, such that the filling is well within the edges of said strip;

(d) closing said sheet of bread-like casing dough provided with said strips of intermediate layer of said cake batter or dough so that the filling is entirely enclosed, first by the intermediate layer of said cake batter or dough and subsequently by the bread-like casing dough; and (e) subjecting the thus formed food product to proofing and baking.

23. A process of preparing a food product according to claim 1, which comprises after the steps (a), (b) and (c) the following steps:

(d) covering said filling with a second strip of said intermediate layer of said cake batter or dough such that the said second strip is almost equal and similar to said first strip of intermediate layer of said cake batter or dough;

(e) closing said strips of intermediate layer of said cake batter or dough around the filling and closing said sheet of bread-like casing around the filling encased by said intermediate layer of said cake batter or dough; and (f) subjecting the thus formed food product to proofing and baking.

24. A process of preparing a food product according to claim 22, in which after step (e), the baked food product is packaged and then post-pasteurized.

25. A method of controlling moisture migration in a food product comprising a casing and a moisture-containing filling contained within the casing, the method comprising including an intermediate layer between the filling and the casing, the intermediate layer being of a cake batter or cake dough which upon baking of the food product results in a cake material having a specific volume of from 1.5 to 4.0 $m^3/kg$.

26. A method of imparting softness to a food product comprising a casing and a moisture-containing filling contained within the casing, the method comprising including an intermediate layer between the filling and the casing, the intermediate layer being of a cake batter or cake dough which upon baking of the food product results in a cake material having a specific volume of from 1.5 to 4.0 $m^3/kg$ between the filling and the casing.

* * * * *